United States Patent
Tanaka

(10) Patent No.: US 8,743,417 B2
(45) Date of Patent: Jun. 3, 2014

(54) IMAGE FORMING APPARATUS CONFIGURED TO GENERATES COMPOSITE IMAGE HAVING SAME RESOLUTION, FROM IMAGES HAVING DIFFERENT RESOLUTIONS, IMAGE FORMING METHOD, AND INTEGRATED CIRCUIT

(75) Inventor: Shinya Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 182 days.

(21) Appl. No.: 13/325,823

(22) Filed: Dec. 14, 2011

(65) Prior Publication Data
US 2012/0154828 A1      Jun. 21, 2012

(30) Foreign Application Priority Data

Dec. 20, 2010  (JP) .................................. 2010-283783
Jun. 14, 2011  (JP) .................................. 2011-132603

(51) Int. Cl.
*H04N 1/46* (2006.01)
*H04N 1/407* (2006.01)

(52) U.S. Cl.
USPC ........... 358/1.2; 358/3.27; 358/538; 358/539; 358/540

(58) Field of Classification Search
None
See application file for complete search history.

(56) References Cited

U.S. PATENT DOCUMENTS

| | | | |
|---|---|---|---|
| 5,734,390 A * | 3/1998 | Sakaizawa et al. | ................ 347/2 |
| 7,508,408 B2 | 3/2009 | Kanzaki et al. | |
| 7,561,835 B2 | 7/2009 | Tanaka et al. | |
| 7,653,339 B2 | 1/2010 | Yamashita et al. | |
| 7,720,418 B2 | 5/2010 | Tanaka et al. | |
| 7,738,819 B2 | 6/2010 | Honda et al. | |
| 7,941,087 B2 | 5/2011 | Tanaka et al. | |
| 7,970,334 B2 | 6/2011 | Yamashita et al. | |
| 7,979,017 B2 | 7/2011 | Tanaka et al. | |
| 7,991,342 B2 | 8/2011 | Kabata et al. | |
| 8,080,096 B2 | 12/2011 | Yamashita et al. | |
| 8,081,916 B2 | 12/2011 | Tanaka et al. | |
| 8,081,917 B2 | 12/2011 | Nakai et al. | |
| 2003/0026496 A1 * | 2/2003 | Nou | ............................. 382/264 |
| 2003/0231321 A1 * | 12/2003 | Aoyama | ........................ 358/1.2 |
| 2006/0239722 A1 | 10/2006 | Tanaka et al. | |
| 2006/0245794 A1 | 11/2006 | Honda et al. | |
| 2007/0097201 A1 | 5/2007 | Kanzaki et al. | |
| 2007/0224528 A1 | 9/2007 | Yamashita et al. | |
| 2008/0095553 A1 | 4/2008 | Tanaka et al. | |
| 2008/0118286 A1 | 5/2008 | Yamashita et al. | |
| 2008/0138132 A1 | 6/2008 | Yamashita et al. | |

(Continued)

FOREIGN PATENT DOCUMENTS

JP      09-200551 A      7/1997
JP      2007-030456 A    2/2007

*Primary Examiner* — Benny Q Tieu
*Assistant Examiner* — Haris Sabah
(74) *Attorney, Agent, or Firm* — Harness, Dickey & Pierce, P.L.C.

(57) ABSTRACT

An image forming apparatus is for forming an image with the use of image data items having different resolutions that are input to the image forming apparatus. The image forming apparatus includes a controller unit configured to store the image data items having different resolutions, and report image format information of the image data items; resolution conversion units configured to convert the image data items having different resolutions acquired from the controller unit to have the same resolution, based on the image format information reported from the controller unit; and an image forming unit configured to form the image with the use of the image data items that have been converted by the resolution conversion units to have the same resolution.

8 Claims, 13 Drawing Sheets

(56) References Cited

U.S. PATENT DOCUMENTS

| | | |
|---|---|---|
| 2009/0196665 A1 | 8/2009 | Tanaka et al. |
| 2009/0279930 A1 | 11/2009 | Kabata et al. |
| 2009/0285613 A1 | 11/2009 | Nakai et al. |
| 2009/0290919 A1 | 11/2009 | Tanaka et al. |
| 2009/0304423 A1 | 12/2009 | Ozaki et al. |
| 2009/0311014 A1 | 12/2009 | Tanaka et al. |
| 2010/0034560 A1 | 2/2010 | Tanaka et al. |
| 2010/0054829 A1 | 3/2010 | Iio et al. |
| 2010/0183972 A1 | 7/2010 | Hasegawa et al. |
| 2010/0209143 A1 | 8/2010 | Nakai et al. |
| 2010/0239309 A1 | 9/2010 | Tanaka et al. |
| 2010/0310291 A1 | 12/2010 | Tanaka et al. |
| 2011/0008088 A1 | 1/2011 | Nakai et al. |
| 2011/0158525 A1 * | 6/2011 | Narita .......................... 382/166 |

* cited by examiner

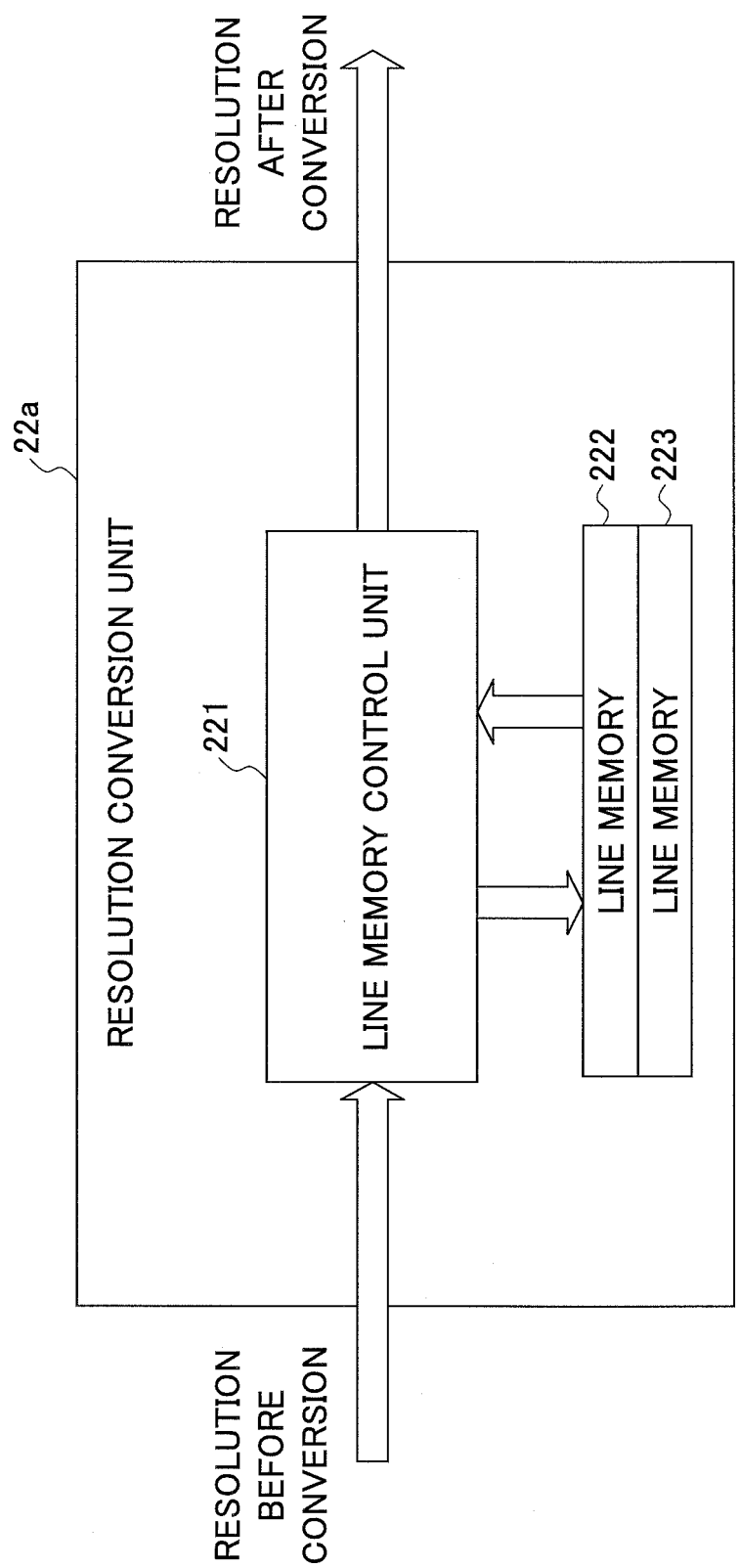

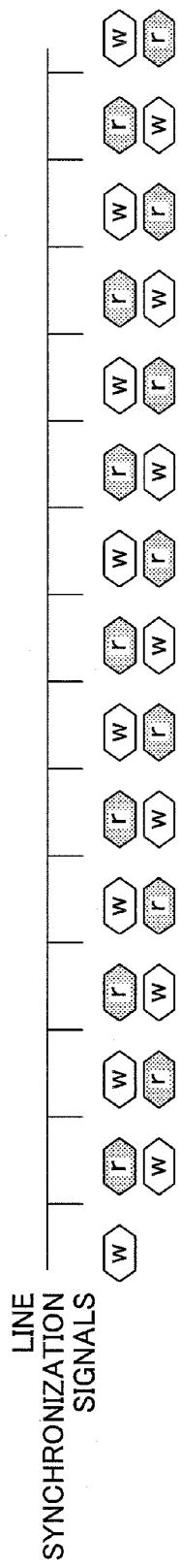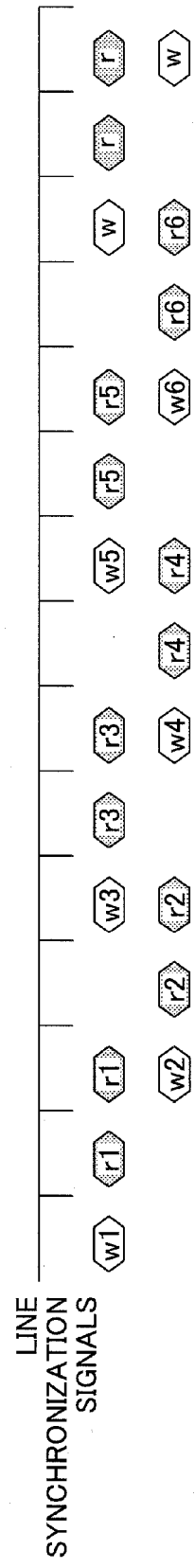

FIG.9A
FIG.9B
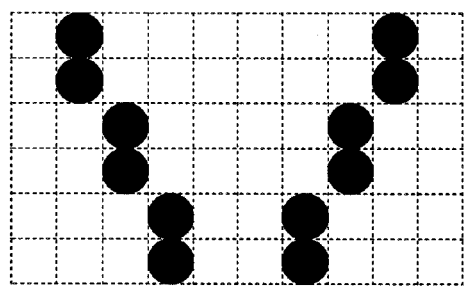
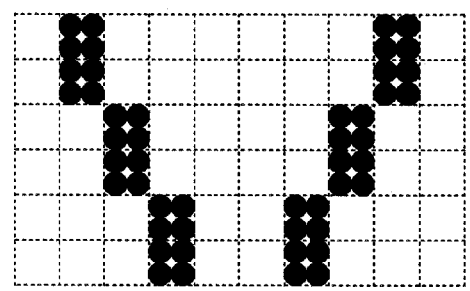
FIG.10
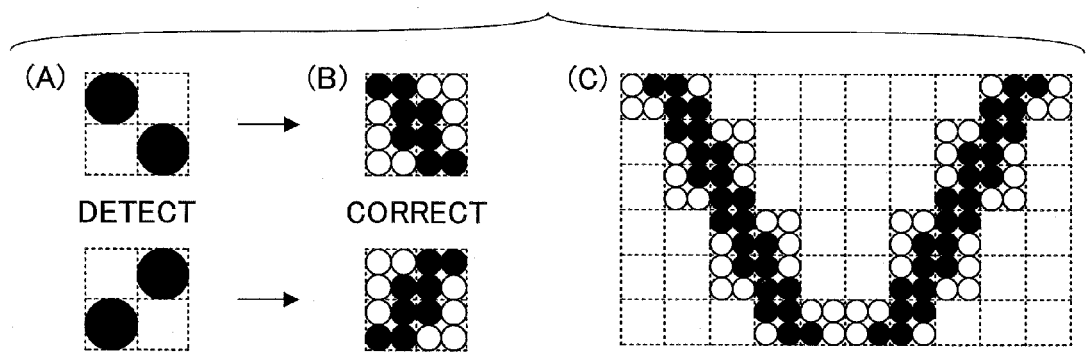
(A) DETECT → (B) CORRECT (C)

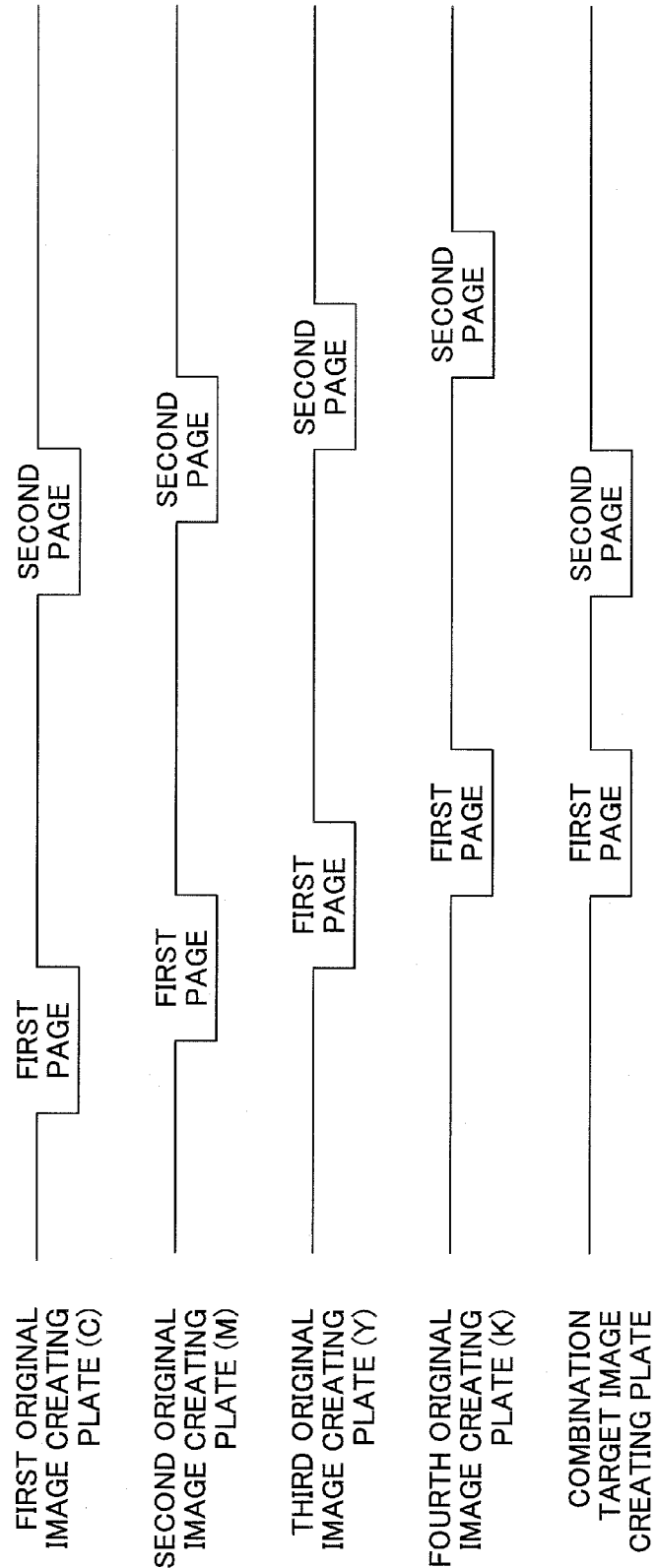

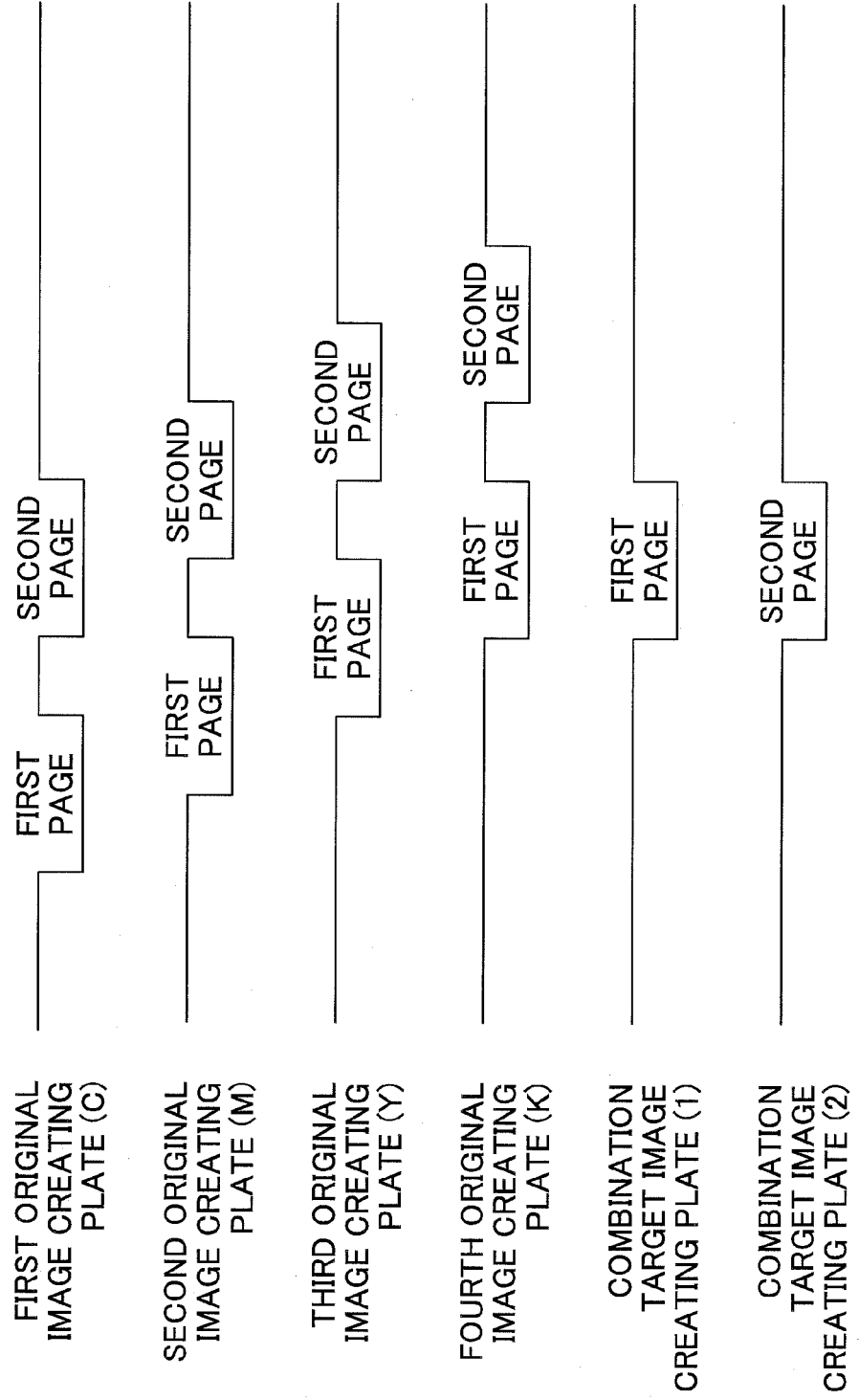

IMAGE FORMING APPARATUS CONFIGURED TO GENERATES COMPOSITE IMAGE HAVING SAME RESOLUTION, FROM IMAGES HAVING DIFFERENT RESOLUTIONS, IMAGE FORMING METHOD, AND INTEGRATED CIRCUIT

BACKGROUND OF THE INVENTION

1. Field of the Invention

The present invention relates to an image forming apparatus, an image forming method, and an integrated circuit.

2. Description of the Related Art

Conventionally, an image forming apparatus for forming color images includes toner used for forming images of regular colors such as cyan (C), magenta (M), yellow (Y), and black (K), as well as transparent toner that is applied to an output image for providing glossiness, and background image toner that is exclusively provided for background images such as background patterns.

When transparent toner and background image toner are used for forming color images, video data of transparent images and background pattern images usually does not need to be as high resolution as video data of regular color images. That is to say, at a controller unit for transferring video data to a plotter image processing unit, the video data of transparent images and background pattern images may be prepared with a lower resolution than that of video data of regular color images, for the purpose of saving memory space and improving transfer performance.

For example, at the controller unit, regular color images are prepared with image data of 600 dpi, while background pattern images are prepared with image data of 300 dpi and transparent images are prepared with image data of 200 dpi. In order to implement such a configuration, there is known an image forming apparatus including plural optical scanning devices, in which some of the optical scanning devices are operated at a different resolution from that of other optical scanning devices (see, for example, patent document 1).

Incidentally, when the optical scanning devices provided in a conventional image forming apparatus have a configuration in which light beams of all image creating plates (e.g., CMYK image creating plates and transparent image creating plate created by the respective toner types) are applied to one polygon mirror acting as a beam reflecting unit so that the light beams are deflected, all of the images will have the same scanning period and the same line period. Thus, images of all image creating plates will be formed by the same (common) resolution. Furthermore, the plotter engine that drives the optical scanning devices operates all image creating plates by the same resolution.

For example, when image data of 300 dpi for a background pattern image and image data of 200 dpi for a transparent image are prepared in a memory of the control unit, the following process is performed. The image data items are read from the memory, the controller unit performs a process of magnifying the image data items by two times or three times, and then the magnified image data items are returned to the memory. According to this process, the respective image data items are converted to 600 dpi, so that all image creating plates are operated by the same resolution.

However, when performing the above process, the processing data amount in the controller unit increases, and therefore the memory capacity needs to be increased. Furthermore, when transferring the video data that has undergone the above process from the controller unit to the plotter image processing unit, the processing performance may decline due to an insufficient data transfer bandwidth.

Furthermore, when combining a regular color image and a background pattern image at a plotter image processing unit, if the respective image data items in the memory of the above-described controller unit have different resolutions, the resolutions need to be matched before combining the images. When matching the resolutions at the controller unit, the processing data amount increases in the controller unit, and therefore the memory capacity needs to be increased. Accordingly, the processing performance may decline due to an insufficient data transfer bandwidth.

Patent Document 1: Japanese Laid-Open Patent Publication No. 2007-030456

SUMMARY OF THE INVENTION

The present invention provides an image forming apparatus, an image forming method, and an integrated circuit, in which one or more of the above-described disadvantages are eliminated.

A preferred embodiment of the present invention provides an image forming apparatus, an image forming method, and an integrated circuit with which image data items of different resolutions corresponding to respective image creating plates, to be output on the same page, can be converted to have a resolution appropriate for the plotter engine, without the need of a controller magnifying the image data items and writing the magnified image data items into a controller memory.

According to an aspect of the present invention, there is provided an image forming apparatus for forming an image with the use of image data items having different resolutions that are input to the image forming apparatus, the image forming apparatus including a controller unit configured to store the image data items having different resolutions, and report image format information of the image data items; resolution conversion units configured to convert the image data items having different resolutions acquired from the controller unit to have the same resolution, based on the image format information reported from the controller unit; and an image forming unit configured to form the image with the use of the image data items that have been converted by the resolution conversion units to have the same resolution.

According to an aspect of the present invention, there is provided an image forming method for forming an image with the use of image data items having different resolutions that are input to an image forming apparatus, the image forming method including storing the image data items having different resolutions; reporting image format information of the image data items; converting the image data items having different resolutions stored at the storing to have the same resolution, based on the image format information reported at the reporting; and forming the image with the use of the image data items that have been converted at the converting to have the same resolution.

According to an aspect of the present invention, there is provided an integrated circuit provided in an image forming apparatus for forming an image with the use of image data items having different resolutions that are input to the image forming apparatus, the integrated circuit including a controller unit configured to store the image data items having different resolutions, and report image format information of the image data items; and resolution conversion units configured to convert the image data items having different resolutions acquired from the controller unit to have the same resolution, based on the image format information reported from the controller unit.

BRIEF DESCRIPTION OF THE DRAWINGS

Other objects, features and advantages of the present invention will become more apparent from the following detailed description when read in conjunction with the accompanying drawings, in which:

FIG. 4 illustrates a configuration example of a resolution conversion unit according to the first embodiment;

FIG. 5 is for describing control timings of writing and reading when the resolution is not changed (same resolution);

FIG. 6 is for describing control timings of writing and reading when the resolution is converted to be twice as dense;

FIGS. 9A and 9B indicate resolution data being doubled in the main and sub scanning directions;

FIG. 10 indicates the resolution data undergoing a smoothing process;

FIG. 13 is for describing the time differences when the transfer sheet passes through; and FIGS. 14A and 14B indicate the timings when combination target images combined by a combining unit are created by respective image creating stations.

DETAILED DESCRIPTION OF THE PREFERRED EMBODIMENTS

According to an embodiment of the present invention, in an image forming apparatus having plural image creating stations, input image data items of different resolutions corresponding to respective image creating plates to be output on the same page can be converted to have a resolution appropriate for the plotter engine, without the need of magnifying the image data items with a controller and writing the magnified image data items into a controller memory. Accordingly, the difference in resolution between the image data items of the respective image creating stations can be adjusted, while keeping a small amount of data in the controller memory.

A description is given, with reference to the accompanying drawings, of embodiments of the present invention.

Outline of Image Forming Apparatus According to First Embodiment

Figure 1:
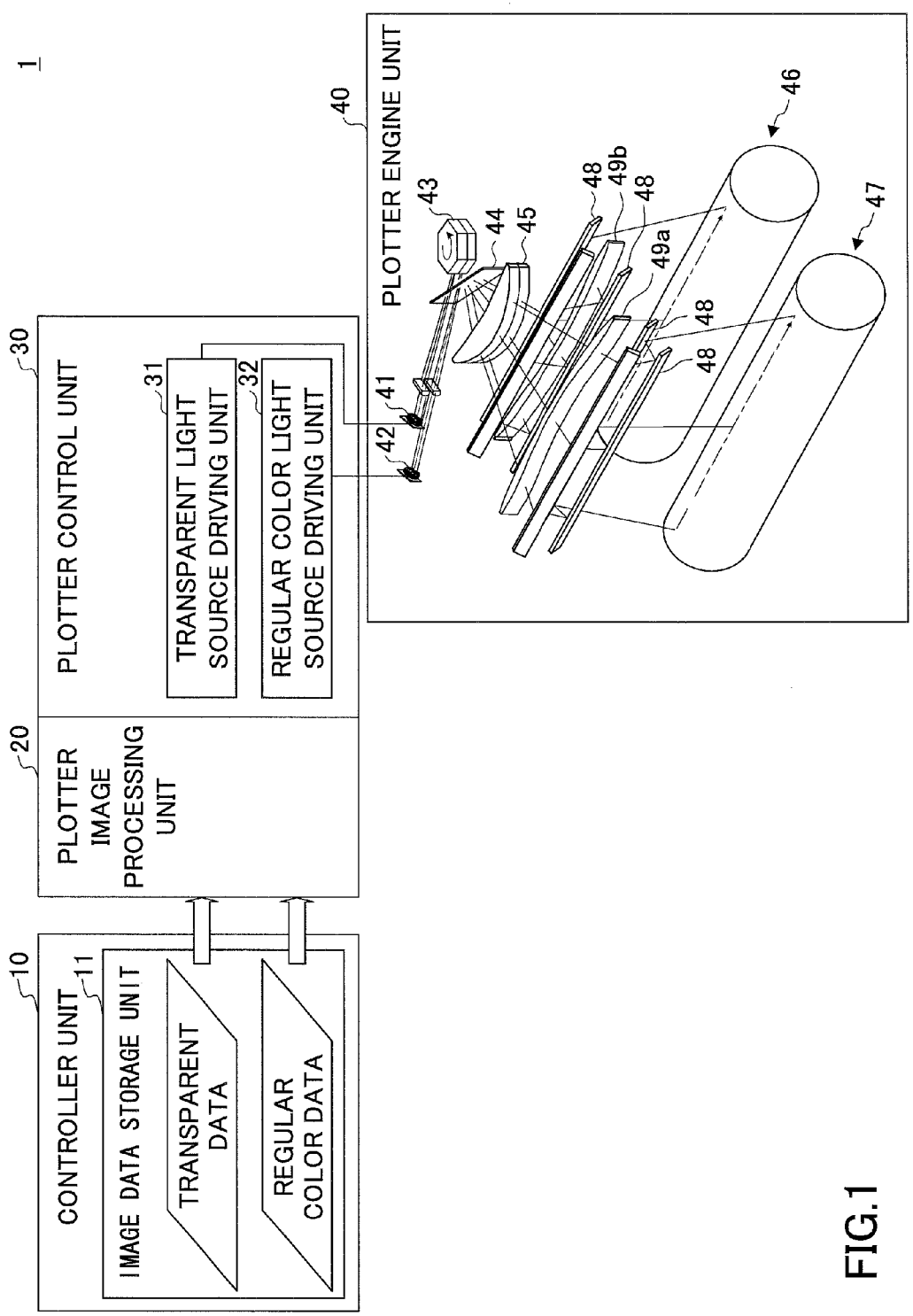
FIG. 1 illustrates a schematic configuration of an image forming apparatus according to a first embodiment.

FIG. 1 illustrates a schematic configuration of an image forming apparatus according to a first embodiment. As shown in FIG. 1, an image forming apparatus 1 according to the first embodiment includes a controller unit 10, a plotter image processing unit 20, a plotter control unit 30, and a plotter engine unit 40 acting as an image forming unit.

The controller unit 10 includes an image data storage unit 11. The image data storage unit 11 stores, for example, transparent image data (transparent data) for forming an image with transparent toner, and regular color image data (regular color data: data of respective image creating plates of CMYK) for forming a color image with toner that is regularly used for forming images (for example, the basic colors of cyan (C), magenta (M), yellow (Y), and black (K)).

The transparent data and regular color data according to the first embodiment are video data to be the source of the plotter image of the image forming apparatus 1. According to an image forming instruction given by the user, the video data is transferred from the controller unit 10 to the plotter image processing unit 20.

The plotter image processing unit 20 converts the transparent data and the regular color data input from the controller unit 10 to have the same (common) resolution, so that the data is converted into light source control signals appropriate for the plotter engine unit 40. The specific configuration of the plotter image processing unit 20 is described below.

The plotter control unit 30 includes a transparent light source driving unit 31 and a regular color light source driving unit 32. When transparent images are formed at the plotter engine unit 40 according to input light source control signals, the transparent light source driving unit 31 controls the operation of turning on/off the corresponding light source unit (transparent light source unit 41 described below).

When regular color images are formed at the plotter engine unit 40 according to input light source control signals, the regular color light source driving unit 32 controls the operation of turning on/off the corresponding light source unit (regular color light source unit 42 described below).

The plotter engine unit 40 includes the transparent light source unit 41, the regular color light source unit 42, a polygon mirror 43 acting as a deflecting unit, anti-dust glass 44, an fθ lens 45, regular color (for example, the respective colors of CMYK) image creating stations 46 for forming images with the use of color toner that is regularly used for forming images, a transparent image creating station 47 for forming images using transparent toner, mirrors 48, a first scanning lens 49a, and a second scanning lens 49b.

The plotter engine unit 40 drives the above-described optical scanning devices to create images at the regular color image creating stations 46 and the transparent image creating station 47 with the use of image data items, whose resolutions have been converted according to need at the plotter image processing unit 20 for the respective image creating stations.

A detailed description is given of a method of creating images at the image creating stations in the plotter engine unit 40. First, as shown in FIG. 1, the light beams, which are rectified and emitted from the transparent light source unit 41 and the regular color light source unit 42, enter the polygon mirror 43. The polygon mirror 43 deflects the entered light beams.

The light beams that have been deflected as above pass through the anti-dust glass 44, permeate through the fθ lens 45, and are converted into light beams for scanning at a constant speed. The light beams for scanning at a constant speed pass through the mirrors 48, the first scanning lens 49a, and the second scanning lens 49b, and are focused onto scanning surfaces of the regular color image creating stations 46 and the transparent image creating station 47 for creating image data.

In the embodiment shown in FIG. 1, transparent data and regular color data are shown; however, the present invention is not so limited.

The above configuration may also accommodate data other than transparent data and regular color data, such as background pattern data (background color data).

Part of Optical System and Part of Image Creating Units

Figure 2:
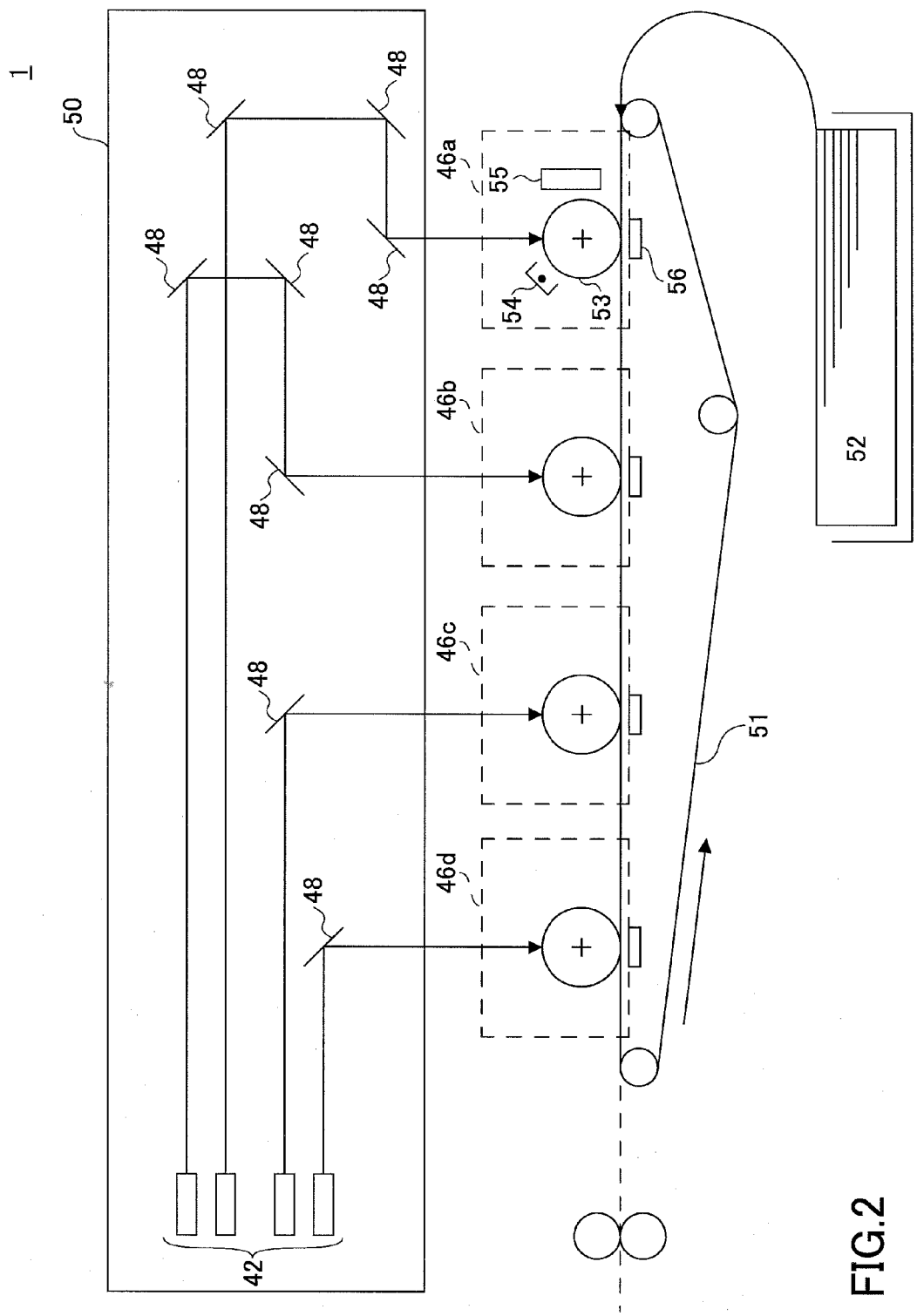
FIG. 2 illustrates a part of an optical system and part of the image creating units of the image forming apparatus shown in FIG. 1.

With reference to FIG. 2, a detailed description is given of a part of an optical system and a part of the image creating units of the image forming apparatus 1 described above. FIG. 2 illustrates a part of an optical system and a part of the image creating units of the image forming apparatus 1 shown in FIG. 1.

In the example of FIG. 2, as the optical system, an exposure unit 50 including the regular color light source units 42 and the mirrors 48 is shown. Furthermore, as a part of the image creating units, regular color image creating stations 46a through 46d for cyan (C), magenta (M), yellow (Y), and black (K) are shown, in which toner images of regular colors are formed.

The image forming apparatus 1 shown in FIG. 2 includes the exposure unit 50 and the regular color image creating stations 46a through 46d described above, as well as a transfer belt 51 and a sheet feeding device 52. Each of the regular color image creating stations 46a through 46d includes a photoconductor 53, a charger 54, a developing device 55, and a transfer device 56.

For example, a photoconductive drum is used as the photoconductor 53. The photoconductor 53 is rotated by a rotation driving unit, and is uniformly charged by the charger 54. Subsequently, the photoconductor 53 moves in the sub scanning direction while light beams from the exposure unit 50 repeatedly scan the photoconductor 53 by reciprocating scanning, so that a two-dimensional image is written onto the photoconductor 53. Accordingly, an electrostatic latent image is formed on the photoconductor 53.

The electrostatic latent image formed on the photoconductor 53 is developed by the developing device 55 into a toner image. The transfer device 56 transfers the toner image onto a transfer sheet conveyed from the sheet feeding device 52 by the transfer belt 51. Then, the toner image is fixed onto the transfer sheet by a fixing device.

As described above, an image forming apparatus that forms regular color images and transparent images includes the regular color image creating stations 46a through 46d and the transparent image creating station 47 corresponding to toners of the respective colors.

Functional Configuration of First Embodiment

Figure 3:
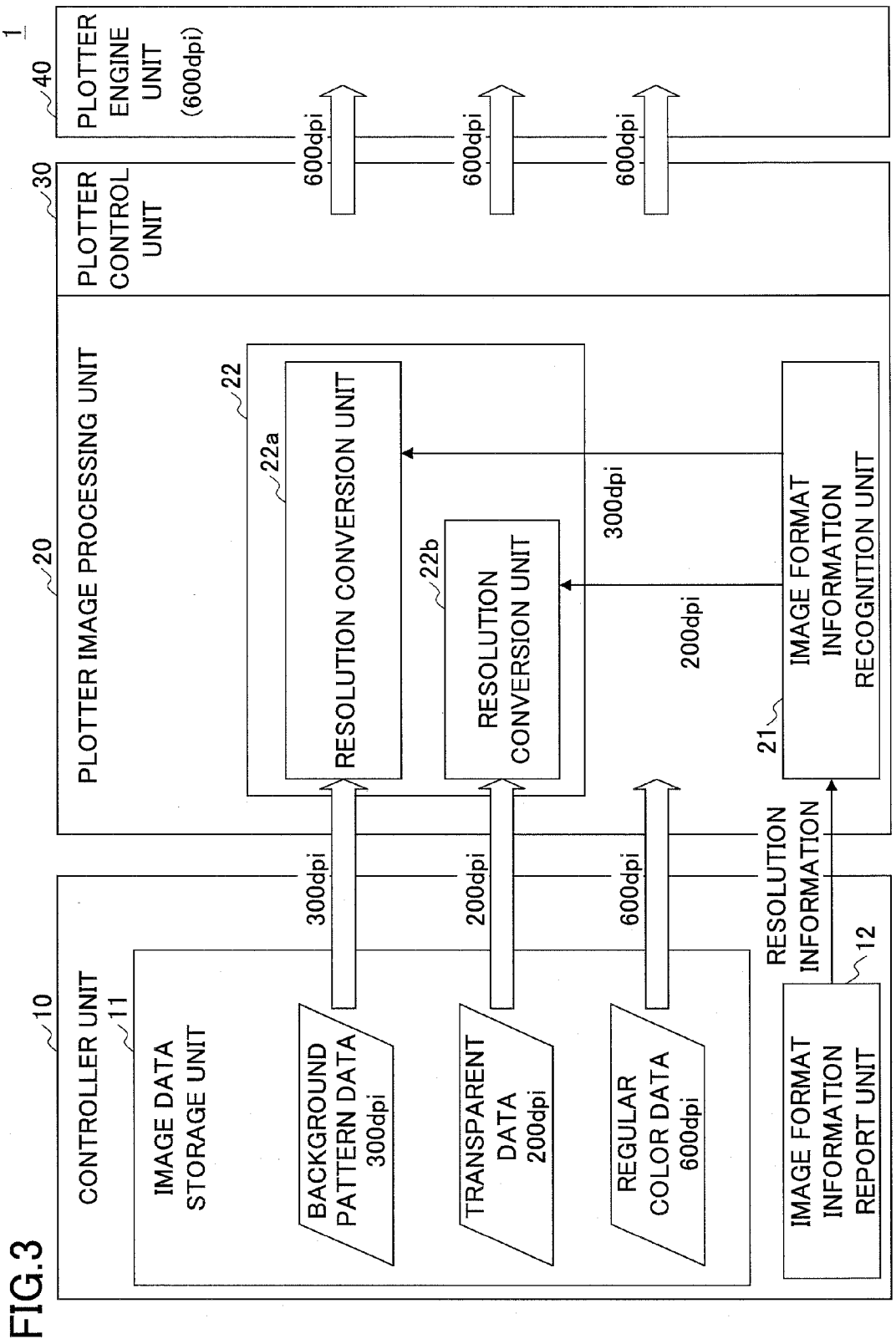
FIG. 3 illustrates a specific functional configuration of the image forming apparatus according to the first embodiment.

Next, with reference to FIG. 3, a description is given of the specific functional configuration of the controller unit 10 and the plotter image processing unit 20 of the image forming apparatus 1 according to the first embodiment. FIG. 3 illustrates a specific functional configuration of the image forming apparatus 1 according to the first embodiment.

The image forming apparatus 1 shown in FIG. 3 has a functional configuration (for example, image creating stations) for accommodating regular color toners (CMYK) and transparent toner described above, as well as background pattern toner (toner for background images).

The image forming apparatus 1 shown in FIG. 3 includes the controller unit 10, the plotter image processing unit 20, the plotter control unit 30, and the plotter engine unit 40. The controller unit 10 includes an image data storage unit 11 and an image format information report unit 12. The plotter image processing unit 20 includes an image format information recognition unit 21 and a resolution conversion unit 22.

The image data storage unit 11 is provided with image data items of different resolutions corresponding to the respective image creating stations (regular color image creating stations 46a through 46d, transparent image creating station 47, background pattern image creating station, etc.) for outputting regular color toner images, a transparent toner image, and a background pattern toner image on the same page.

In FIG. 3, the image data storage unit 11 is provided with image data of 300 dpi for a background pattern image, image data of 200 dpi for a transparent image, and image data of 600 dpi for regular color images.

The image format information report unit 12 acquires resolution information as image format information of the respective image creating plates (image data) stored in the image data storage unit 11, and reports the acquired resolution information to the image format information recognition unit 21 of the plotter image processing unit 20.

Furthermore, as shown in FIG. 3, the image format information recognition unit 21 of the plotter image processing unit 20 recognizes the resolution information of the respective image data items reported from the image format information report unit 12 of the controller unit 10. Then, the image format information recognition unit 21 reports, to the resolution conversion unit 22, the resolution information of the image data items transferred from the controller unit 10.

The resolution conversion unit 22 performs a magnification process of magnifying the respective image data items (background pattern data, transparent data, and regular color data) input from the controller unit 10, into data of a predetermined resolution according to the resolution to be sent to the plotter engine unit 40 (600 dpi in the example of FIG. 3), based on the resolution information reported from the image format information recognition unit 21.

In the example of FIG. 3, the resolution conversion unit 22 includes a resolution conversion unit 22a for converting resolution of background pattern data and a resolution conversion unit 22b for converting resolution of transparent data. Therefore, in FIG. 3, the image format information recognition unit 21 reports resolution information (300 dpi) of background pattern data to the resolution conversion unit 22a, and reports resolution information (200 dpi) of transparent data to the resolution conversion unit 22b.

When the resolution conversion unit 22a acquires resolution information (300 dpi) of background pattern data and resolution information (600 dpi) of regular color data from the image format information recognition unit 21, the resolution conversion unit 22a converts the resolution of the input background pattern data so as to be the same (common) as the resolution of regular color data. Furthermore, when the resolution conversion unit 22b acquires resolution information (200 dpi) of transparent data and resolution information (600 dpi) of regular color data from the image format information recognition unit 21, the resolution conversion unit 22b converts the resolution of the input transparent data so as to be the same as the resolution of regular color data.

That is to say, when image data (in the example of FIG. 3, the background pattern data 300 dpi and the transparent data 200 dpi other than the regular color data) having a resolution that is different from the resolution (in the example of FIG. 3, 600 dpi) set for regular color data is input, the resolution conversion units 22a and 22b convert the resolution of the input image data so as to be the same as the resolution of regular color data.

The resolution conversion units 22a and 22b in the first embodiment are functions that are provided when the resolutions of background image data and transparent data are different from the resolution of regular color data. The resolution conversion units 22a and 22b may function as a single resolution conversion unit 22 to convert the resolutions of background image data and transparent data. To attain an output resolution appropriate for the plotter engine unit 40, the resolution of regular color data may also be converted in addition to converting the resolutions of background image data and transparent data, to make the resolutions of the respective image data items to be the same.

The resolution conversion unit 22 converts the resolutions of the image data items so that background pattern data, transparent data, and regular color data have the same resolution. Therefore, different resolution conversion units 22 may be provided for the respective image data items. However, in consideration of cost and processing efficiency, as shown in FIG. 3, it is preferable to convert the resolution of one of the image data items into the resolution of one of either of the background pattern data, transparent data, or regular color data (for example, the data having the highest resolution). In this case, there only needs to be two or less resolution conversion units.

The plotter control unit 30 controls the plotter engine unit 40 with the use of light source driving units corresponding to the respective image data items (for example, the transparent light source driving unit 31 and the regular color light source driving unit 32 shown in FIG. 1), so that the respective image data items input from the plotter image processing unit 20 have the same resolution (600 dpi in the example of FIG. 3).

As described above, when creating images to be formed on the same page, even if image data items of different resolutions created by the respective image creating stations are prepared in the controller unit 10, by providing the resolution conversion unit 22 in the plotter image processing unit 20, the difference in image data resolutions between the respective image creating stations can be absorbed. By absorbing the difference in image data resolutions between the respective image creating stations, the plotter engine unit 40 can operate based on a single resolution.

Furthermore, in the image data storage unit 11 of the controller unit 10, the image data can be stored in an amount corresponding to low resolution. Therefore, the need of increasing the memory capacity of the image data storage unit 11 in the controller unit 10 can be mitigated. Furthermore, there is leeway in the performance of transferring data from the controller unit 10 to the plotter image processing unit 20.

The respective functions of the controller unit 10 and the plotter image processing unit 20 can be constituted as an integrated circuit.

Configuration Example of Resolution Conversion Unit 22

Next, with reference to FIG. 4, a description is given of a configuration of the resolution conversion unit 22. FIG. 4 illustrates a configuration example of the resolution conversion unit 22 according to the first embodiment. With reference to FIG. 4, a description is given of an example of converting the resolution of background pattern data (300 dpi) into a resolution that is twice as dense in the sub scanning direction (for example, 600 dpi:300 dpi×2), in the resolution conversion unit 22a.

As shown in FIG. 4, the resolution conversion unit 22a includes a line memory control unit 221 and two line memories for changing the magnification in the sub scanning direction (line memory 222, line memory 223). In this example, two line memories are toggle controlled to perform writing and reading by time division. Furthermore, the line memory control unit 221 switches the control timing of reading according to the magnification ratio of resolution conversion.

FIG. 5 is for describing the control timings of writing and reading when the resolution is not changed (same resolution). FIG. 6 is for describing the control timings of writing and reading when the resolution is converted to be twice as dense.

In FIGS. 5 and 6, "w" indicates the period (timing) of writing, and "r" indicates the period (timing) of reading.

For example, as shown in FIG. 5, when the resolution is the same (the density is not changed), the line memory control unit 221 controls the process so that reading and writing are alternately performed by the line memory 222 and the line memory 223 at the same time, by using line synchronization signals (synchronization detection period) as a reference.

For example, according to a first synchronization signal, the line memory control unit 221 writes a first line in the line memory 222. According to a second synchronization signal, the line memory control unit 221 reads the first line from the line memory 222 while writing a second line into the line memory 223. In this manner, the writing and reading operations are switched according to line synchronization signals.

Furthermore, as shown in FIG. 6, also in the case of converting the resolution to be twice as dense, the line memory control unit 221 switches the writing and reading operations by using line synchronization signals as a reference. Meanwhile, in the case of converting the resolution to be twice as dense, the line memory control unit 221 writes the first line in the line memory 222 according to a first synchronization signal, and subsequently, reads the first line from the line memory 222 according to a second synchronization signal, and then writes the second line in the line memory 223 while reading the first line from the line memory 222 according to a third synchronization signal. In this manner, in the case of converting the resolution to be twice as dense, the conversion of the resolution is performed by passing two lines of the same data to a subsequent stage.

Also in the case of converting the resolution to be three times or four times as dense, the resolution conversion unit 22 can adjust the timing as described above based on a predetermined density and perform a similar process to the above.

Figure 7:
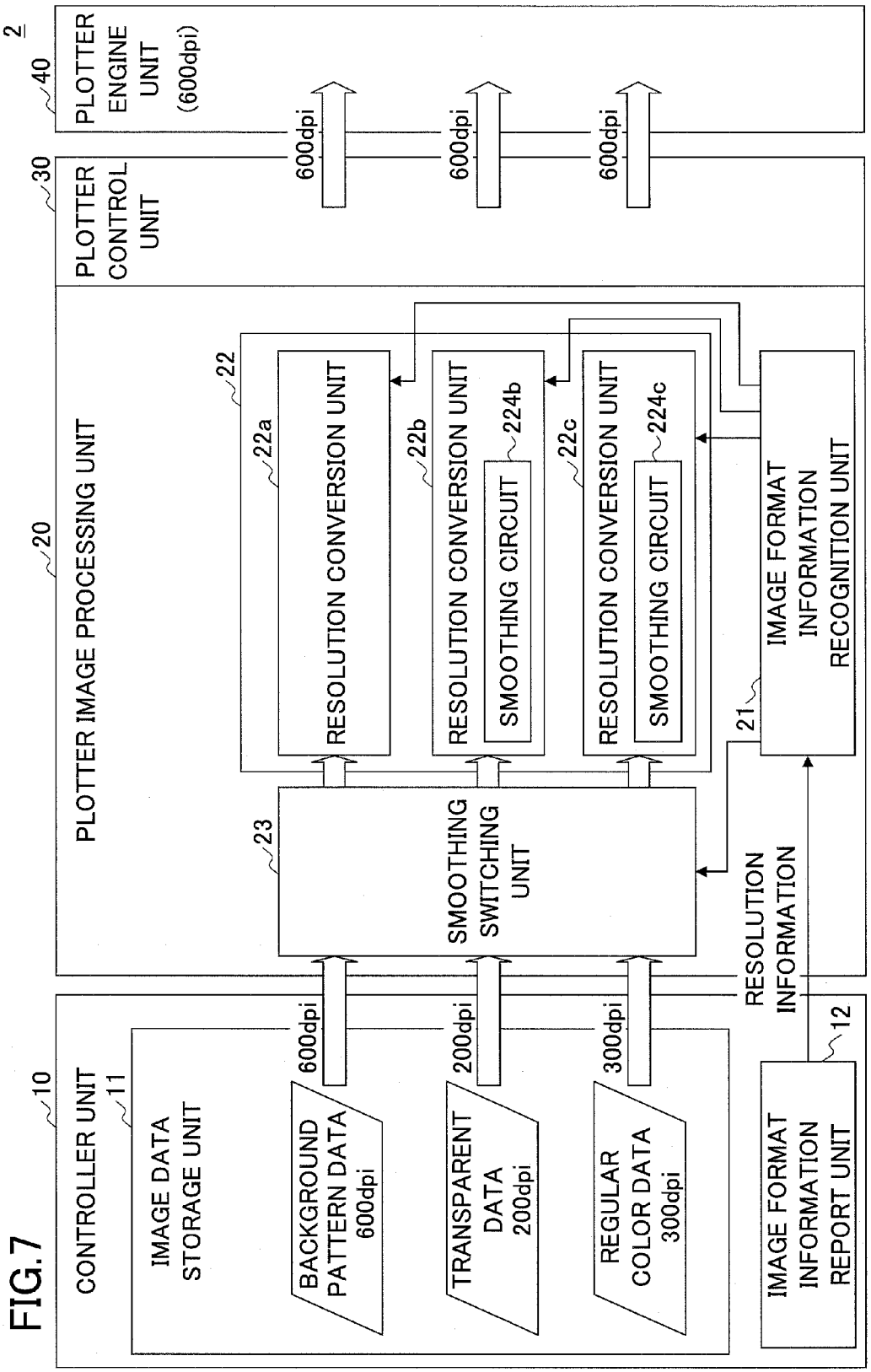
FIG. 7 illustrates a functional configuration of an image forming apparatus according to a second embodiment.

Functional Configuration of Image Forming Apparatus According to Second Embodiment Next, with reference to FIG. 7, a description is given of a functional configuration of an image forming apparatus 2 according to a second embodiment. FIG. 7 illustrates a functional configuration of the image forming apparatus 2 according to the second embodiment.

The second embodiment is different from the first embodiment in that the plotter image processing unit 20 is provided with the resolution conversion unit 22 including smoothing circuits (smoothing units) for performing a smoothing process when converting the input image data items having different resolutions into image data having the same resolution, and a smoothing switching unit. In the following description, the same functions as those of the first embodiment are denoted by the same reference numerals, and are not further described.

As shown in FIG. 7, the plotter image processing unit 20 of the image forming apparatus 2 according to the second embodiment includes the image format information recognition unit 21, the resolution conversion units 22a and 22b, and a smoothing switching unit 23.

In the example of FIG. 7, the resolution conversion unit 22a does not include a smoothing circuit, but the resolution conversion unit 22b includes a smoothing circuit 224b and a resolution conversion unit 22c includes a smoothing circuit 224c.

The smoothing switching unit 23 determines the image data item on which a smoothing process is to be performed with the use of the smoothing circuits 224b and 224c when converting the resolution, among the image data items input from the controller unit 10, based on the resolution information of the respective image data items reported from the image format information recognition unit 21.

The smoothing switching unit 23 performs a switching operation of outputting the image data on which a smoothing process is to be performed to the resolution conversion units 22b and 22c including the smoothing circuits 224, and outputting the image data on which a smoothing process is not be performed to the resolution conversion unit 22a.

For example, the smoothing switching unit 23 determines an image data item having relatively low resolution (transparent data and regular color data of the example in FIG. 7) requires a smoothing process to be performed, based on resolution information relevant to background pattern data, transparent data, and regular color data reported from the image format information recognition unit 21.

The smoothing switching unit 23 outputs the image data items determined as above to the resolution conversion units 22b and 22c including the smoothing circuits 224b and 224c, and outputs image data items (other than the image data items determined to have a relatively high resolution like the background pattern data in the example of FIG. 7) to the resolution conversion unit 22a without a smoothing circuit.

As described above, by providing the smoothing switching unit 23, even if image data items having different resolutions corresponding to the respective image creating plates to be output on the same page are input from the controller unit 10, only the resolution of the image data having a lower resolution can be converted with the use of the smoothing circuit 224. Furthermore, not all of the resolution conversion units 22 need to be provided with a smoothing circuit 224, and therefore the costs for providing additional circuits for implementing the smoothing function described below can be mitigated, while improving the image quality.

Configuration of Resolution Conversion Unit Having Smoothing Circuit

Figure 8:
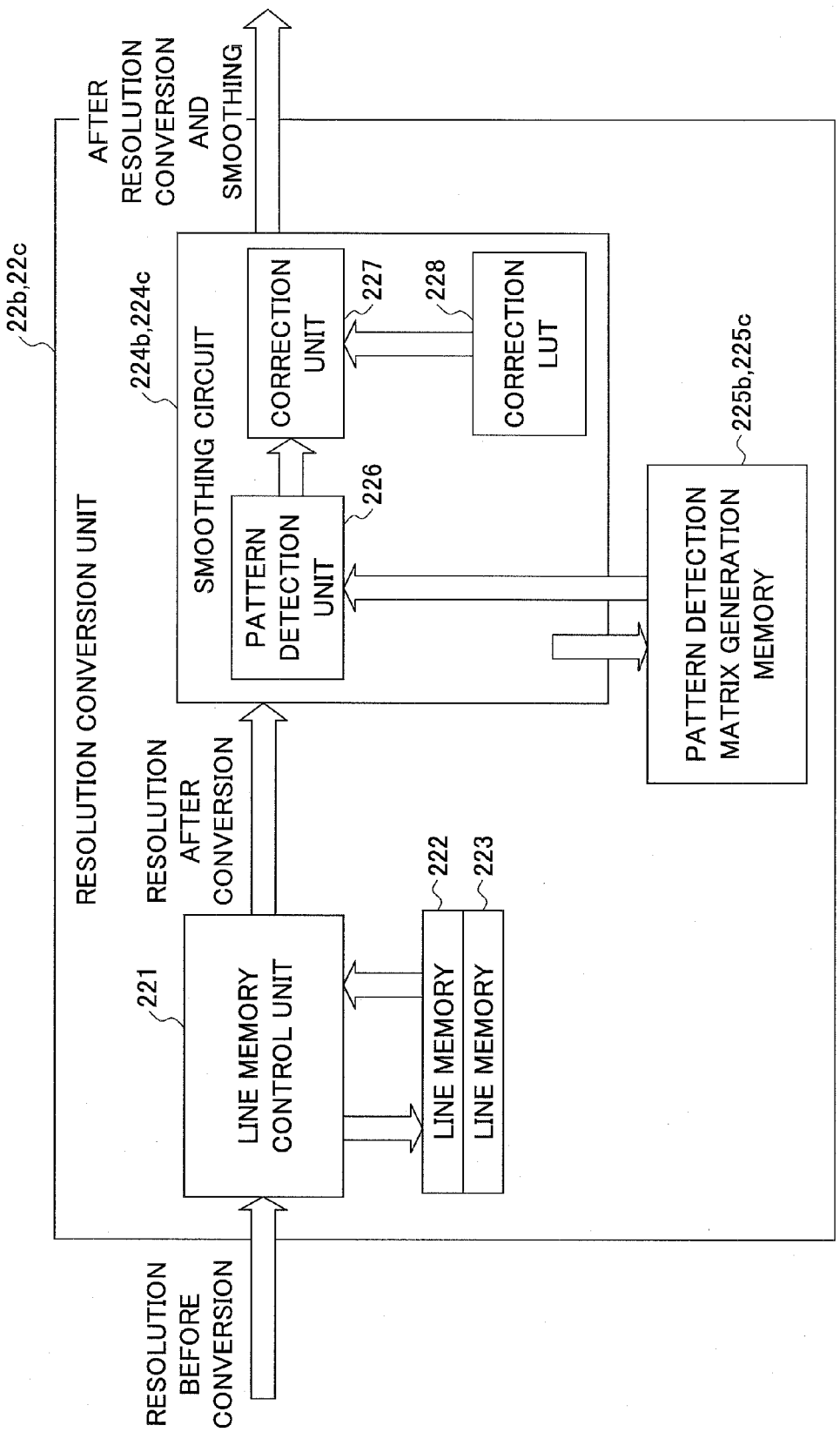
FIG. 8 illustrates a configuration of a resolution conversion unit provided with a smoothing circuit.

Next, with reference to FIG. 8, a description is given of a configuration example of the resolution conversion unit 22 provided with the above-described smoothing circuit 224. FIG. 8 illustrates a configuration of the resolution conversion unit 22 provided with the smoothing circuit 224.

As shown in FIG. 8, the resolution conversion units 22b and 22c according to the second embodiment respectively include the smoothing circuits 224b and 224c and pattern detection matrix generation memories 225b and 225c for detecting patterns. Furthermore, the smoothing circuits 224b and 224c each include a pattern detection unit 226, a correction unit 227, and a correction LUT (look-up table) 228.

The pattern detection unit 226 detects a pattern constituting image data on which a smoothing process is to be performed, from the image data input from the line memory control unit 221 whose resolution has been converted, by referring to the corresponding pattern detection matrix generation memory 225b, 225c.

The pattern detection matrix generation memory 225b, 225c stores, for example, a matrix used by the pattern detection unit 226 for detecting a pattern constituting the image data on which a smoothing process is to be performed.

The correction unit 227 corrects the pattern detected by the pattern detection unit 226, by referring to the correction LUT 228 that is set in advance.

The correction LUT 228 includes, for example, a matrix used by the correction unit 227 for correcting the pattern of the image data.

In the second embodiment, by providing the resolution conversion unit 22 with the above-described smoothing circuits 224b, 224c, a smoothing process can be performed on the image data whose resolution has been converted.

Next, with reference to FIGS. 9A through 10, a detailed description is given of the smoothing process. FIGS. 9A and 9B indicate the resolution data being doubled in the main and sub scanning directions. FIG. 10 indicates the resolution data undergoing the smoothing process.

Specifically, when the line memory control unit 221 shown in FIG. 8 converts the resolution data shown in FIG. 9A by doubling the resolution in the main and sub scanning directions, the data is converted as shown in FIG. 9B.

When performing a smoothing process on the image data whose resolution has been converted with the use of the smoothing circuit 224b, 224c, either the data in FIG. 9A or the data in FIG. 9B may be input to the smoothing circuit 224b, 224c. In the example described below, the resolution data of FIG. 9A is input to the smoothing circuit 224b, 224c.

The pattern detection unit 226 of the smoothing circuit 224b, 224c detects, from the input data of FIG. 9A, black pixels arranged in oblique diagonal positions in the 2×2 matrix shown in FIG. 10A, by referring to the pattern detection matrix generation memory 225b, 225c. The pattern detection matrix generation memory 225b, 225c stores detection patterns constituting image data on which a smoothing process is to be performed, including the black pixels in the 2×2 matrix shown in FIG. 10A.

Next, the correction unit 227 makes the correction as shown in FIG. 10 (B), by referring to the LUT table stored in the correction LUT 228. The correction LUT 228 stores the LUT table indicating the contents for correcting the data shown in FIG. 10 (A) into the data shown in FIG. 10 (B).

By performing the above process, the smoothing circuit 224b, 224c can perform the smoothing process of correcting the data shown in FIG. (A) into the data shown in FIG. 10 (C).

In order to implement the above-described smoothing process, the pattern detection matrix generation memory 225b, 225c shown in FIG. 8 is necessary. Furthermore, the correction LUT 228 shown in FIG. 8 is necessary for determining what kind of correction is to be performed by the correction unit 227 upon detecting the pattern. If these elements are provided in the resolution conversion unit 22, additional circuits are needed, which leads to an increase in cost.

Accordingly, in the second embodiment, as shown in FIG. 7, the number of smoothing circuits 224 (two circuits in the example of FIG. 7) is less than the number of image creating stations provided in the image forming apparatus (such as the regular color image creating stations 46, the transparent image creating station 47, and the background pattern image creating station), and the image creating stations using the smoothing circuits are switched. Accordingly, there is no need to provide smoothing circuits for all of the image creating stations. Thus, the image quality can be improved while mitigating an increase in cost.

Figure 11:
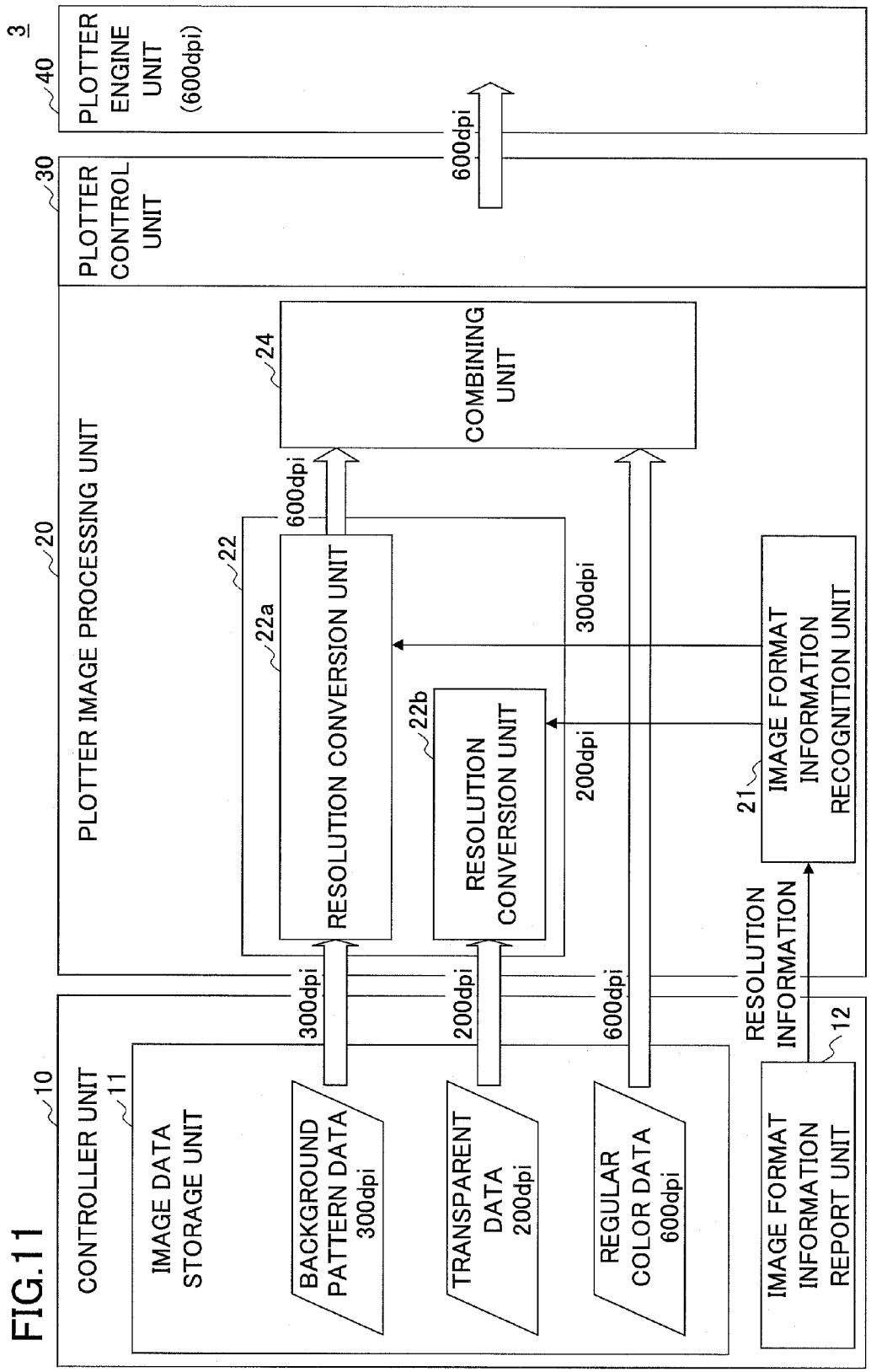
FIG. 11 illustrates a functional configuration of an image forming apparatus according to a third embodiment.

Functional Configuration of Image Forming Apparatus According to Third Embodiment Next, with reference to FIG. 11, a description is given of a functional configuration of an image forming apparatus 3 according to a third embodiment. FIG. 11 illustrates a functional configuration of the image forming apparatus 3 according to the third embodiment. The third embodiment is different from the first embodiment in that a combining unit 24 is provided at a subsequent stage to the resolution conversion unit 22 in the plotter image processing unit 20.

In the following example of the third embodiment, one of the combining targets to be combined and output is regular color data, and the other one of the combining targets is background pattern data. However, the present invention is not so limited. For example, transparent data may be used instead of regular color data or background pattern data, and transparent data may be included in regular color data and background pattern data. In the following description, functions corresponding to those of the first embodiment are denoted by the same reference numerals, and are not further described.

As shown in FIG. 11, the plotter image processing unit 20 of the image forming apparatus 3 according to the third embodiment includes the image format information recognition unit 21, the resolution conversion unit 22 (resolution conversion units 22a, 22b in FIG. 11), and the combining unit 24.

The combining unit 24 is provided at a subsequent stage to the resolution conversion unit 22, and combines the image data items that have been converted to the same resolution by the resolution conversion unit 22. In the example of FIG. 11, the combining unit 24 combines the background image data (600 dpi) whose resolution has been converted by the resolution conversion unit 22a with the regular color data (600 dpi), and outputs the combined image data to the plotter control unit 30.

As described above, in a configuration where plural input images are combined and output, when image data items of different resolutions are prepared in the controller unit 10 (in the example of FIG. 11, the background pattern data 300 dpi and the regular color data 600 dpi), the difference in resolution between the image data items can be equalized before combining the image data. Furthermore, in the image data storage unit 11 of the controller unit 10, the image data can be stored in a data amount corresponding to a lower resolution. Therefore, the need of increasing the memory capacity of the image data storage unit 11 in the controller unit 10 can be mitigated. Furthermore, it is possible to solve the problem of an insufficient data transfer bandwidth when transferring the data from the controller unit 10 to the plotter image processing unit 20.

Figure 12:
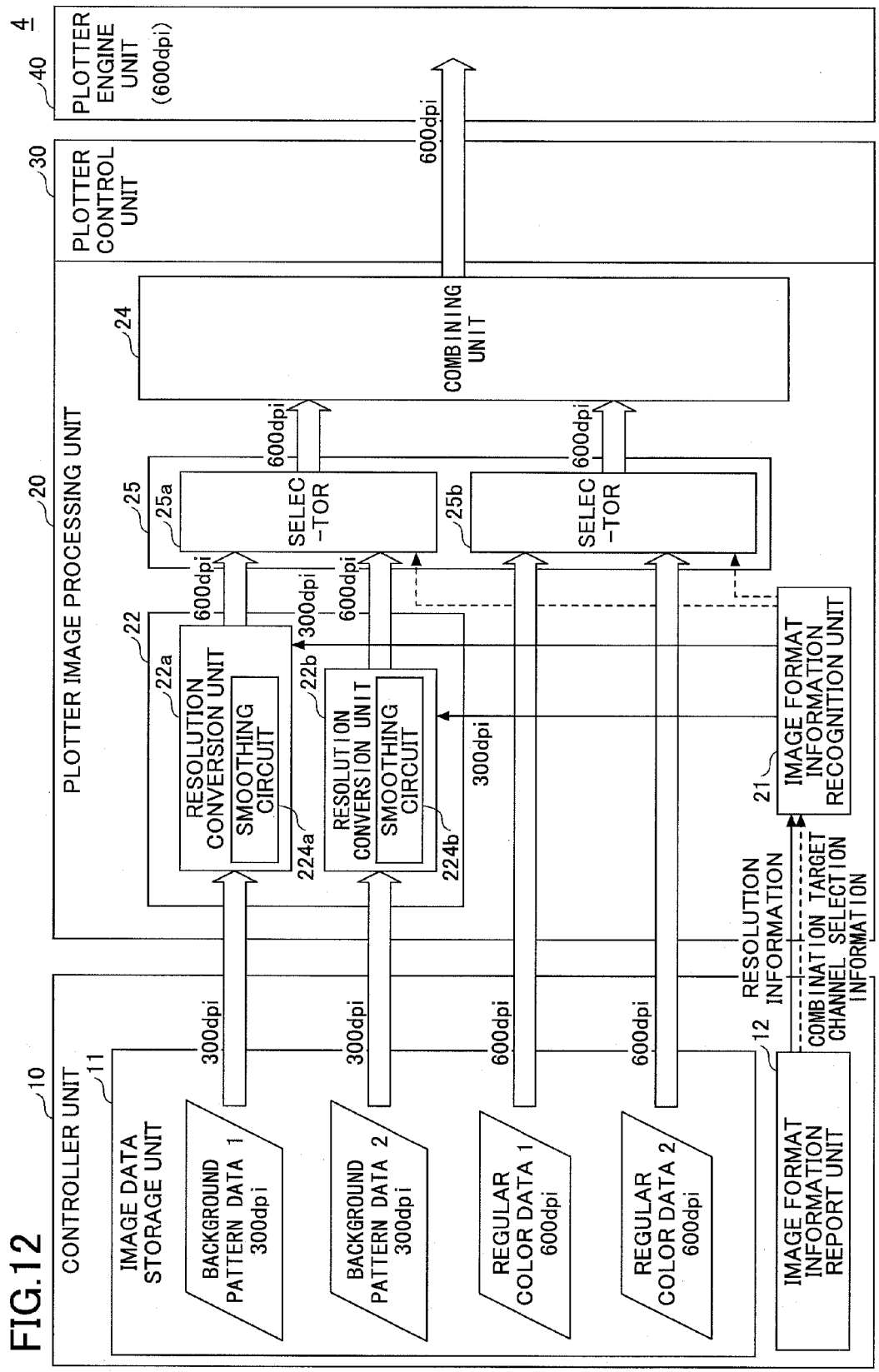
FIG. 12 illustrates a functional configuration of an image forming apparatus according to a fourth embodiment.

Functional Configuration of Image Forming Apparatus According to Fourth Embodiment Next, with reference to FIG. 12, a description is given of a functional configuration of an image forming apparatus 4 according to a fourth embodiment. FIG. 12 illustrates a functional configuration of the image forming apparatus 4 according to the fourth embodiment.

The fourth embodiment is different from the first embodiment in that the controller unit 10 includes plural channels of regular color data (for example, CMYK image creating plates), and the plotter image processing unit 20 has a selector unit for selecting the channels to be combined. In the fourth embodiment, similar to the second embodiment, smoothing circuits are provided in the resolution conversion unit 22. In the following description, functions corresponding to those of the third embodiment are denoted by the same reference numerals, and are not further described.

In the example of FIG. 12, the image data storage unit 11 of the controller unit 10 includes background pattern data 1 (300 dpi), background pattern data 2 (300 dpi), regular color data 1 (600 dpi), and regular color data 2 (600 dpi).

The image format information report unit 12 acquires, as combination target channel selection information, the image format information of the respective image data items stored in the image data storage unit 11. Then, the image format information report unit 12 reports the acquired combination target channel selection information to the image format information recognition unit 21 of the plotter image processing unit 20.

The plotter image processing unit 20 includes the image format information recognition unit 21, the resolution conversion unit 22 (in the example of FIG. 12, resolution conversion units 22a, 22b), the combining unit 24, and a selector 25. The resolution conversion unit 22a includes a smoothing circuit 224a, and the resolution conversion unit 22b includes the smoothing circuit 224b.

The selector 25 includes selectors 25a, 25b corresponding to the respective types of image data (for example, background pattern data, regular color data). The selectors 25a, 25b select the channels to be targets of combination based on the combination target channel selection information reported from the image format information recognition unit 21. According to the reported combination target channel selection information, the selectors 25a, 25b switch the input combination target channels, and outputs the combination target channels to the combining unit 24.

A detailed description is given with reference to FIG. 12.

The selector 25a selects the image data item to be the target of combination by the combining unit 24, from between the background pattern data 1 and background pattern data 2 whose resolutions have been converted by the resolution conversion units 22a and 22b (in the example of FIG. 12, both 600 dpi), based on the combination target channel selection information reported from the image format information recognition unit 21.

The selector 25b selects the image data item to be the target of combination by the combining unit 24, from between the regular color data 1 and regular color data 2 (in the example of FIG. 12, both 600 dpi), based on the combination target channel selection information reported from the image format information recognition unit 21.

In the example of FIG. 12, each of the regular color data items (regular color data 1, regular color data 2) of the controller unit 10 indicates one of the image creating plates of CMYK to be created for each page. For example, the regular color data 1 is the combination target channel for the first page (for example, K image creating plate) and the regular color data 2 is the combination target channel for the second page (for example, C image creating plate).

The image creating plate to be selected as a combination target among the regular color data items is arbitrarily set, according to the type and contents of the image data that is input in advance, and is input to the image format information report unit 12.

Furthermore, each background pattern data (background pattern data 1, background pattern data 2) in the controller unit 10 shown in FIG. 12 indicates a combination target channel prepared for each page. For example, the background pattern data 1 is the combination target channel to be combined with the first page and the background pattern data 2 is the combination target channel to be combined with the second page.

The combining unit 24 combines the background pattern data 1 or the background pattern data 2 selected by the selector 25a, with the regular color data 1 or the regular color data 2 selected by the selector 25b.

In the fourth embodiment, as described above, combination target channels to be combined for the third and fourth pages may also be provided in advance, in addition to the combination target channels to be combined for the first and second pages.

As described above, in the fourth embodiment, when plural channels for background pattern data and regular color data are input, the selector 25 for selecting the combination target channels to be combined is provided. Accordingly, the image data items selected by the selector 25 are combined and output by the combining unit 24.

Time Difference When Transfer Sheet Passes

In the case of an image forming apparatus that forms color images as described in FIG. 2, the photoconductors 53 of the respective image creating plates, i.e., image creating stations (for example, the regular color image creating stations 46a through 46d) are spaced apart from each other. Thus, the transfer sheet conveyed by the transfer belt 51 passes through the respective photoconductors 53 at different timings. Therefore, the images are created at the respective image creating plates at different timings.

Figure 13:
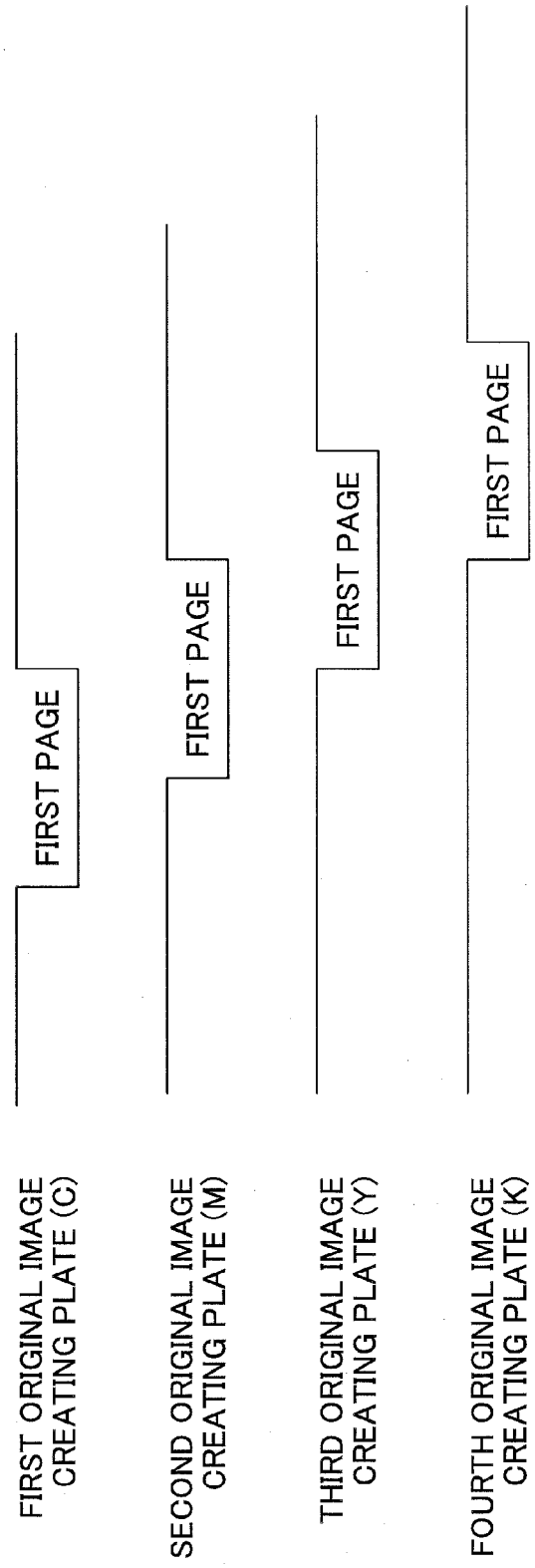

FIG. 13 is for describing the time differences when the transfer sheet passes through the respective photoconductors 53. The first original image creating plate (C) through the fourth original image creating plate (K) shown in FIG. 13 respectively indicate the image creating plates (CMYK) at the regular color image creating stations 46a through 46d shown in FIG. 2. Furthermore, the timings at which images created at the image creating plates of the respective regular color image creating stations 46a through 46d, i.e., the timings at which the transfer sheet passes through the respective photoconductors 53, are indicated.

As shown in FIG. 13, the timings of creating the images for the first page at the respective image creating plates (timings when the transfer sheet passes through the respective image creating plates) are shifted according to the positions of the regular color image creating stations 46a through 46d, from the first original image creating plate (C) through the fourth original image creating plate (K).

FIGS. 14A and 14B indicate the timings when the combination target images combined by the combining unit 24 are created by respective image creating stations. FIG. 14A indicates the timings when the images are created at the respective image creating stations when there is only one combination target image creating plate. FIG. 14B indicates the timings when the images are created at the respective image creating stations when there are two or more combination target image creating plates.

The first original image creating plate (C) through the fourth original image creating plate (K) shown in FIGS. 14A and 14B indicate the timings at which the images of the image creating plates (CMYK) for the respective pages are created at the image creating stations (for example, regular color image creating stations 46a through 46d). Furthermore, the combination target image creating plates shown in FIGS. 14A and 14B indicate the timings at which images of the combined image data items combined by the combining unit 24 are created for the respective pages.

In the example of FIG. 14A, the first page of the combination target image creating plate combined by the combining unit 24 is combination image data created by combining the combination target image creating plate with the fourth original image creating plate (K) (in the example of FIG. 12, combination image data created by combining the regular color data 1 and the background pattern data 1). The second page of the combination target image creating plate is combination image data created by combining the combination target image creating plate with the first original image creating plate (C) (in the example of FIG. 12, combination image data created by combining the regular color data 2 and the background pattern data 2).

In this case, as shown in FIG. 14A, an image of the first page for the combination target image creating plate is created at the same timing as an image of the first page for the fourth original image creating plate (K), and an image of the second page for the combination target image creating plate is created at the same timing as an image of the second page for the first original image creating plate (C).

When there is only one combination target image creating plate, the image of the first page for the combination target image creating plate is created at the same timing as the fourth original image (K). Then, to create the image of the second page for the combination target image, the combination target image creating plate needs to be activated once again after the image of the first page for the combination target image creating plate is created. Thus, a dead time occurs between the pages (first page and second page) as indicated in FIG. 14A.

Therefore, the combining unit 24 combines combination target images (in the example of FIG. 12, the background pattern data 1 or the background pattern data 2) with the plural image creating plates (for example, the K image creating plate for the first page, and the C image creating plate for the second page) which are set in advance as combination targets for the respective pages. Furthermore, the plotter engine unit 40 controls the combination target image creating plates of the respective combinations (for example, the combination of regular color data 1 (K image creating plate) and background pattern data 1; and the combination of regular color data 2 (C image creating plate) and background pattern data 2), so that the set image creating plates (K and C image creating plates) create images at the same time.

Specifically, two or more combinations of combination target images to be created at the same time are set in advance. Then, according to selections made by the selector 25 based on the combination target channel selection information shown in FIG. 12, the combining unit 24 prepares two or more combination target image creating plates.

As described above, plural combination condition parameters can be separately set. Therefore, as shown in FIG. 14B, images of the combination target image creating plate (1) and the combination target image creating plate (2) (first and second pages of combination target image creating plate) can be created at the same time. That is to say, in the example of FIG. 14B, the image of the combination target image creating plate (2) is created at the same time as the image of the second page of the first original image creating plate (C), without waiting for the image of the first page of the fourth original image creating plate (K) to be completed. Therefore, the intervals between creating the respective pages can be reduced, thereby improving the image creation productivity of the image forming apparatus.

As described above, according to an embodiment of the present invention, in an image forming apparatus having plural image creating stations, input data items having different resolutions according to the image creating plates for the same page are converted to a resolution appropriate for the plotter engine, without the need of being magnified by a controller and written into a controller memory as in the conventional technology. Therefore, the difference in resolution between the image data items of the respective image creating stations can be adjusted, while keeping the amount of data in the controller memory small.

Furthermore, when combining input images having different resolution data, the difference in resolution can be absorbed at a stage prior to the combining unit. Therefore, the amount of data in the controller memory can be kept small. Accordingly, in the present embodiment, the need of increasing the memory capacity of the controller memory can be mitigated, and the leeway in the transfer performance from the controller can be increased.

By applying an embodiment of the present invention, the following effects can be achieved. For example, in the operation of printing documents that have been received by fax transmission, a smoothing process is usually performed on the black (K) image creating plate. However, when there is no more black toner, and the document is forcibly output with toner of another color, a function of switching the smoothing circuit can be implemented.

Accordingly, the image quality can be improved while preventing the circuit scale from increasing.

According to an embodiment of the present invention, image data items of different resolutions corresponding to respective image creating plates, to be output on the same page, can be converted to have a resolution appropriate for the plotter engine, without the need of magnifying the image data items with a controller and writing the magnified image data items into a controller memory.

The present invention is not limited to the specific embodiments described herein, and variations and modifications may be made without departing from the scope of the present invention.

The present application is based on Japanese Priority Patent Application No. 2010-283783, filed on Dec. 20, 2010, and Japanese Priority Patent Application No. 2011-132603, filed on Jun. 14, 2011, the entire contents of which are hereby incorporated herein by reference.

What is claimed is:

1. An image forming apparatus for forming an image with use of image data items having different resolutions that are input to the image forming apparatus, the image forming apparatus comprising:
a controller unit configured to store the image data items having different resolutions, and report image format information of the image data items;
resolution conversion units configured to convert the image data items having different resolutions acquired from the controller unit to have same resolution, based on the image format information reported from the controller unit;
an image forming unit configured to form the image with the use of the image data items that have been converted by the resolution conversion units to have the same resolution; wherein
one or more of the resolution conversion units include a smoothing unit that performs a smoothing process when converting the image data items having different resolutions to have the same resolution, and one or more of the resolution conversion units do not include the smoothing unit; and
a smoothing switching unit configured to output, to the one or more resolution conversion units including the smoothing unit, an image data item having a lower resolution than other image data items among the image data items having different resolutions.

2. The image forming apparatus according to claim 1, wherein the smoothing unit includes
a pattern detection unit configured to detect a pattern constituting an image data item on which the smoothing process is to be performed among the image data items, and
a correction unit configured to make a correction on the pattern detected by the pattern detection unit by referring to a correction look-up table that is set in advance.

3. The image forming apparatus according to claim 1, further comprising:

a combining unit configured to combine the image data items that have been converted to have the same resolution, wherein
the image forming unit forms the image with the use of the image data items that have been combined by the combining unit.

4. The image forming apparatus according to claim 3, further comprising:
a first selector configured to select a regular color image data item for forming a color image of a regular color, based on the image format information reported from the controller unit; and
a second selector configured to select an image data item having a color other than the regular color, wherein
the combining unit combines the regular color image data item selected by the first selector with the image data item having the color other than the regular color selected by the second selector.

5. The image forming apparatus according to claim 3, wherein
the combining unit creates combined image data items, for combining combination target images with images of plural image forming plates set in advance for each page, and
the image forming unit forms images of the combined image data items at the same time as forming the images of the plural image forming plates set in advance.

6. The image forming apparatus according to claim 5, wherein plural combination condition parameters, which are used for forming the images of the combined image data items at same time as forming the images of the plural image forming plates, can be set separately from one another.

7. An image forming method for forming an image with use of image data items having different resolutions that are input to an image forming apparatus, the image forming method comprising:
storing the image data items having different resolutions;
reporting image format information of the image data items;
converting the image data items having different resolutions stored at the storing to have the same resolution, based on the image format information reported at the reporting and performing a smoothing process when converting the image data items having different resolutions to have same resolution; and
forming the image with the use of the image data items that have been converted at the converting to have the same resolution, and outputting an image data item having a lower resolution than other image data items among the image data items having different resolution.

8. An integrated circuit provided in an image forming apparatus for forming an image with use of image data items having different resolutions that are input to the image forming apparatus comprising a smoothing switching unit configured to output, to the one or more resolution conversion units including the smoothing unit, an image data item having a lower resolution than other image data items among the image data items having different resolutions, the integrated circuit comprising:
a controller unit configured to store the image data items having different resolutions, and report image format information of the image data items; and
resolution conversion units configured to convert the image data items having different resolutions acquired from the controller unit to have same resolution, based on the image format information reported from the controller unit.

* * * * *

UNITED STATES PATENT AND TRADEMARK OFFICE
CERTIFICATE OF CORRECTION

| | | |
|---|---|---|
| PATENT NO. | : 8,743,417 B2 | Page 1 of 1 |
| APPLICATION NO. | : 13/325823 | |
| DATED | : June 3, 2014 | |
| INVENTOR(S) | : Shinya Tanaka | |

It is certified that error appears in the above-identified patent and that said Letters Patent is hereby corrected as shown below:

On the Title Page, Item (54) and in the Specification, Column 1, lines 1-6,

PLEASE CHANGE TITLE TO:

IMAGE FORMING APPARATUS CONFIGURED TO GENERATE COMPOSITE
        IMAGES HAVING SAME RESOLUTION FROM IMAGES HAVING DIFFERENT
        RESOLUTIONS AND IMAGE FORMING METHOD AND INTEGRATED CIRCUIT
        CONFIGURED TO PERFORM THE SAME

Signed and Sealed this
Eighteenth Day of November, 2014

Michelle K. Lee
*Deputy Director of the United States Patent and Trademark Office*